(12) United States Patent
Yang et al.

(10) Patent No.: US 10,228,465 B2
(45) Date of Patent: Mar. 12, 2019

(54) STEERING MIRROR ASSIST FOR LASER POINTING

(71) Applicant: The United States of America, as represented by the Administrator of the National Aeronautics and Space Administration, Washington, DC (US)

(72) Inventors: Guangning Yang, Clarksville, MD (US); Jeffrey R. Chen, Clarksville, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 25 days.

(21) Appl. No.: 15/622,861

(22) Filed: Jun. 14, 2017

(65) Prior Publication Data
US 2018/0364359 A1    Dec. 20, 2018

(51) Int. Cl.
| | |
|---|---|
| *G01S 17/66* | (2006.01) |
| *H04B 10/112* | (2013.01) |
| *G02B 27/10* | (2006.01) |
| *G02B 23/02* | (2006.01) |

(52) U.S. Cl.
CPC .............. *G01S 17/66* (2013.01); *G02B 23/02* (2013.01); *G02B 27/1006* (2013.01); *H04B 10/112* (2013.01)

(58) Field of Classification Search
CPC ..... G01S 17/66; G02B 23/02; G02B 27/1006; H04B 10/112
USPC ........................................................ 250/203.3
See application file for complete search history.

(56) References Cited

U.S. PATENT DOCUMENTS 9,696,408 B2 *  7/2017  Eikenberry ............. G01S 5/163
9,702,702 B1 *  7/2017  Lane .................... G01C 21/025

\* cited by examiner

*Primary Examiner* — Seung C Sohn
(74) *Attorney, Agent, or Firm* — Christopher O. Edwards; Bryan A. Geurts; Mark P. Dvorscak

(57) ABSTRACT

An apparatus for improving a pointing capability of an optical pointing system includes a star tracker attitude control system for maintaining an alignment between the optical pointing system and a target, a beam steering mirror controlled by the star tracker attitude control system to direct an optical signal to impinge on the target, a fixed optical assembly configured to direct a portion of the optical signal from the bean steering mirror into a field of view of a star tracker telescope of the star tracker attitude control system, and a detector array for detecting the portion of the optical signal superimposed over a location in a current star scene in the star tracker telescope field of view, where the star tracker attitude control system is configured to operate the beam steering mirror to maintain the optical signal on the target by maintaining the superimposed signal on the location in the star scene.

16 Claims, 4 Drawing Sheets

STEERING MIRROR ASSIST FOR LASER POINTING

INVENTION BY GOVERNMENT EMPLOYEE(S) ONLY

The invention described herein was made by one or more employees of the United States Government, and may be manufactured and used by or for the Government for governmental purposes without the payment of any royalties thereon or therefor.

BACKGROUND

The disclosed embodiments generally relate to optical communication links and laser optical ranging, and in particular, to optical communication links and laser optical ranging between extraterrestrial bodies.

In space based optical communication and ranging, pointing, or attitude precision is critical as it directly affects the communication link power budget, communication link power fluctuations and the size, weight, and power of the communication or ranging instrumentation. In most examples, the communication link and communication and ranging instrumentation may use optical beams, in particular, lasers. Because of the distances between a space craft and a target, for example, Earth, and the coherence of the optical beam, pointing errors in the micro-radian range may result in missing the target.

A star tracker may be used to determine the attitude of the space craft with respect to the stars. Because the positions of many stars have been accurately measured over the years, a camera may be used with a database of star locations and patterns to determine and adjust the orientation of the spacecraft. The accuracy of the control systems used for attitude adjustment may limit the pointing accuracy. For example, present reaction wheel attitude control systems may limit pointing accuracy to approximately 50 micro-radians. Attitude dynamics, atmospheric drag, magnetic fields, solar radiation pressure, gravity gradients, vibration, and heating and cooling effects may also affect the ability of a space craft attitude control system to maintain a particular attitude in order to accurately direct a communication or ranging beam toward a target.

It would be advantageous to improve provide a system that improves laser beam pointing accuracy to the level of that of the start tracker pointing knowledge so the overall pointing accuracy will not be limited by the accuracy of the control systems used for attitude adjustment.

SUMMARY

The disclosed embodiments are directed to an apparatus for improving a pointing capability of an optical pointing system including a star tracker attitude control system for maintaining an alignment between the optical pointing system and a target, a beam steering mirror controlled by the star tracker attitude control system to direct an optical signal to impinge on the target, a fixed optical assembly configured to direct a portion of the optical signal from the bean steering mirror into a field of view of a star tracker telescope of the star tracker attitude control system, and a detector array for detecting the portion of the optical signal superimposed over a location in a current star scene in the star tracker telescope field of view. The star tracker attitude control system may be configured to operate the beam steering mirror to maintain the optical signal on the target by maintaining the superimposed signal on the location in the star scene.

The apparatus may include sensors for measuring optical pointing system orientation, and actuators for applying force to orient the optical pointing system to a particular attitude.

The optical signal may include a transmitted communication signal.

The apparatus may include a beam combiner for combining a tracking signal with a communication signal to form the optical signal.

The apparatus may include a wavelength dependent beam splitter for splitting the tracking signal from the communication signal after steering by the beam steering mirror, and a transmit telescope in optical communication with the wavelength dependent beam splitter for transmitting the communication signal to the target.

The fixed optical assembly may be configured to direct the tracking signal into the field of view of the star tracker telescope, and the detector array may be configured to for detect a location in the current star scene on which the tracking signal is superimposed.

The star tracker attitude control system may be configured to operate the beam steering mirror to maintain the communication signal on the target by maintaining the superimposed tracking signal on the location in the star scene.

The apparatus may include secondary sensors for detecting a variation in movement of the optical pointing system, and a secondary control system for operating the beam steering mirror to compensate for the detected variation in movement while maintaining the superimposed signal on the location in the star scene.

The disclosed embodiments are also directed to a method of improving a pointing capability of an optical pointing system. The method includes maintaining an alignment between the pointing system and a target using a star tracker attitude control system, controlling a beam steering mirror to direct an optical signal to impinge on the target, using a fixed optical assembly to direct a portion of the optical signal from the bean steering mirror into a field of view of a star tracker telescope of the star tracker attitude control system, superimposing the portion of the optical signal over a location in a current star scene in the star tracker telescope field of view, and operating the beam steering mirror to maintain the optical signal on the target by maintaining the superimposed signal on the location in the star scene.

The star tracker attitude control system may include sensors for measuring optical pointing system orientation, and actuators for applying force to orient the optical pointing system to a particular attitude.

The optical signal may include a transmitted communication signal.

The method may include combining a tracking signal with a communication signal to form the optical signal.

The method may further include splitting the tracking signal from the communication signal after steering by the beam steering mirror, and transmitting the communication signal to the target.

The method may also include directing the tracking signal into the field of view of the star tracker telescope and superimposing the tracking signal over a location in the current star scene in the star tracker telescope field of view.

The method may still further include operating the beam steering mirror to maintain the optical signal on the target by maintaining the superimposed tracking signal on the location in the star scene.

The method may yet further include detecting a variation in movement of the optical pointing system, and operating the beam steering mirror to compensate for the detected variation in movement while maintaining the superimposed signal on the location in the star scene.

BRIEF DESCRIPTION OF THE DRAWINGS

The foregoing aspects and other features of the embodiments are explained in the following description, taken in connection with the accompanying drawings, wherein.

DETAILED DESCRIPTION

Figure 1A:
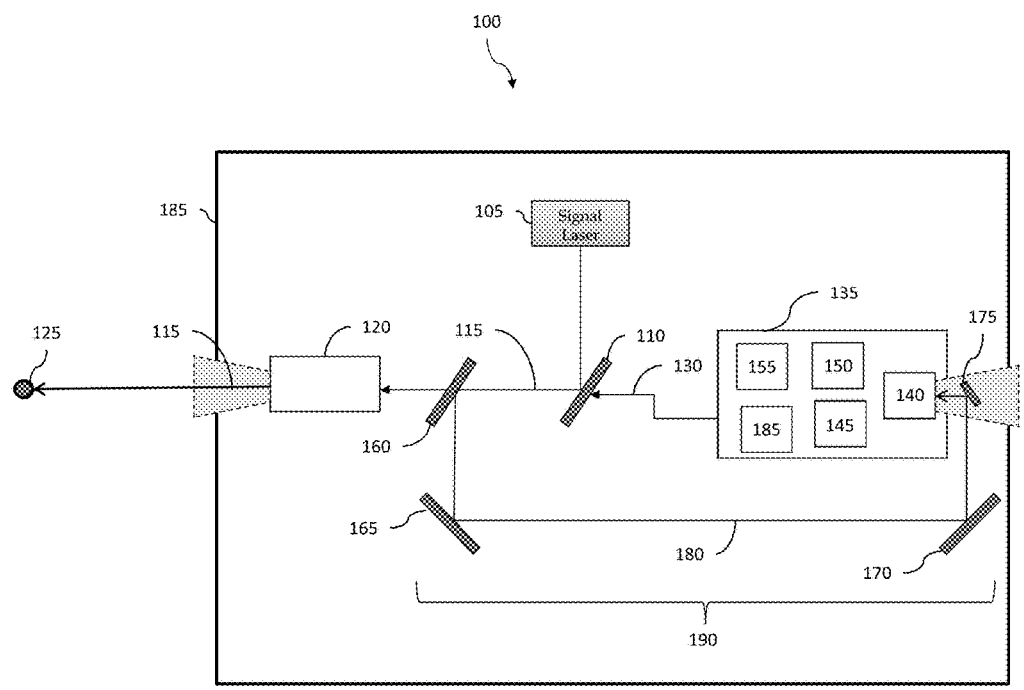
FIG. 1A illustrates an example of an optical pointing system according to the disclosed embodiments.

Although the disclosed embodiments will be described with reference to the embodiments shown in the drawings and described below, it should be understood that these could be embodied in many alternate forms. In addition, any suitable size, shape or type of elements or materials could be used.

The disclosed embodiments are directed to improving the pointing capability of an optical pointing system by adopting a laser beam steering mechanism to a star tracker based altitude control system.

Figure 1B:
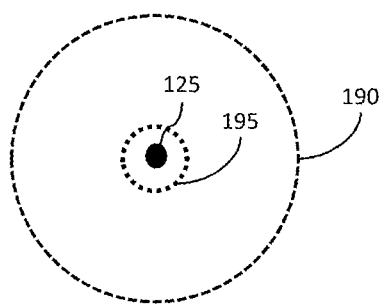
FIG. 1B shows a graphical representation of exemplary system residual pointing errors according to the disclosed embodiments.

FIG. 1A and FIG. 1B illustrate an example of an optical pointing system 100 according to the disclosed embodiments. The optical pointing system 100 may include a signal laser 105 for transmitting information, and a beam steering mirror 110 for determining the direction of the transmitted signal 115 through a transmit telescope 120 to a target 125, which may be a considerable distance away. The beam steering mirror 110 may be controlled by a signal 130 from a star tracker attitude control system 135 including a star tracker telescope 140, one or more star catalogues 145, a processor 150 and a beam steering mirror control system 155. The attitude control system 135 may also include additional components 185, for example, additional sensors for measuring optical pointing system orientation, and actuators for applying force to orient the optical pointing system to a particular attitude. A fixed optical system 190 including a beam splitter 160 and a number of mirrors 165, 170, 175 may also be provided to direct at least a portion of the transmitted signal 115 back into the star tracker telescope 140. Each of the components of the optical pointing system may be mounted on a thermal and vibration stable rigid bench 185.

In operation, the laser pointing system 100 and the beam steering mirror 110 are aligned using an attitude control system, for example, a reaction wheel or other gyroscopic system, in combination with the star tracker system 135 so that the transmitted signal 115 impinges on the target 125. FIG. 1B shows a graphical representation of an exemplary residual pointing error 190 of approximately 50 microradians with respect to the target when initially using only the attitude control system.

In order to decrease the pointing error, a portion of the transmitted signal 115 is split by beam splitter 160 and mirrors 165, 170, 175 are used to direct the split beam 180 into the field of view of the star tracker telescope 140. The slit beam 180 is superimposed over the current star scene in the star tracker telescope field of view and the initial location of the split beam over the current star scene in the star tracker telescope field of view is recorded. For example, the star tracker telescope 140 may include a detector array of pixels and sub-pixels for detecting the current star scene in the star tracker telescope field of view, and the sub pixels on which the split beam is superimposed over the star scene may be recorded. Once recorded, the transmitted signal 115 may be maintained on the target 125 by operating the beam steering mirror 110 to maintain the split beam 180 on the recorded location in the star tracker telescope field of view. If the split beam in the star tracker field of view drifts or otherwise moves away from the recorded location in the star tracker field of view, the processor Returning to FIG. 1B, an exemplary residual pointing error 195 of approximately 5 microradians with respect to the target 125 may be achieved when operating the beam steering mirror 110 to maintain the split beam 180 on the recorded location in the star tracker telescope field of view.

Figure 2:
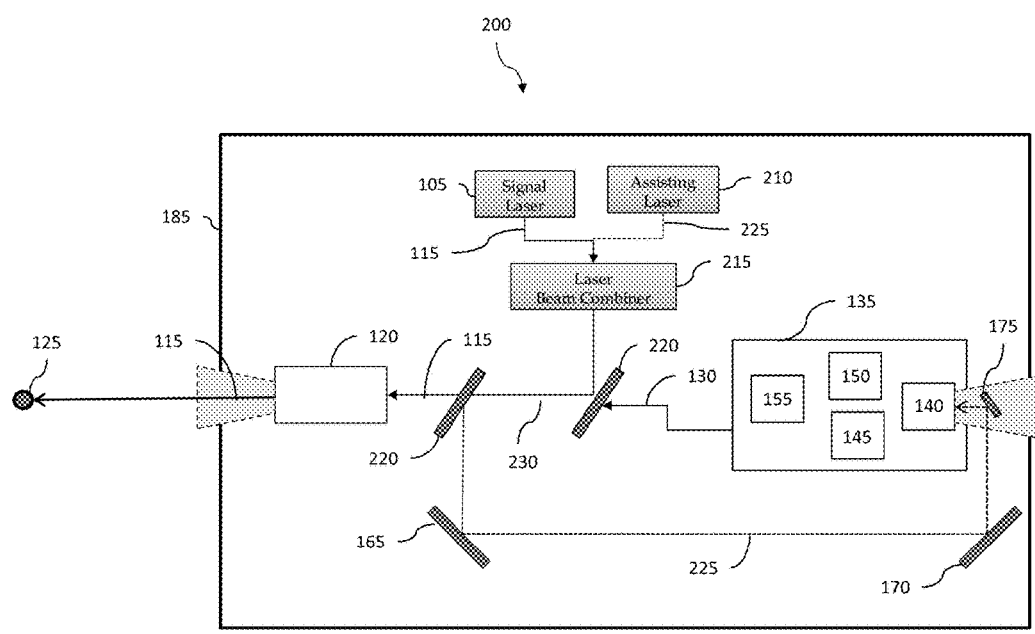
FIG. 2 illustrates another example of an optical pointing system according to the disclosed embodiments.

FIG. 2 illustrates another example of an optical pointing system 200 according to the disclosed embodiments. The optical pointing system 200 is similar to the optical pointing system 100 but may also include a tracking laser 210, a laser combiner 215, and a wavelength dependent beam splitter 220. Rather than simply using the transmitted signal 115 directly from the signal laser 105, it may be advantageous to employ an tracking signal 225. In some embodiments, the transmitted signal may not be detectable by the star tracker telescope, while in one or more embodiments it may be advantageous to select a tracking signal specifically for optimized detection by the star tracker telescope 140. The tracking signal 225 may be combined with the transmitted signal 115 using a laser beam combiner 215. The beam steering mirror 110, under control of the beam steering mirror control system 155 determines the direction of the combined signal 230 toward the wavelength dependent beam splitter 220.

The wavelength dependent beam splitter 220 may split the combined signal 230 and direct the transmitted signal 115 through the transmit telescope 120, and also direct the tracking signal 225 to mirrors 165, 170, 175 and into the field of view of the star tracker telescope 140. The tracking signal 225 may be superimposed over the current star scene in the star tracker telescope field of view and the location of the tracking signal 225 over the current star scene in the star tracker telescope field of view may be recorded. The beam steering mirror 110 may be operated to maintain the tracking signal on the recorded location in the star tracker telescope field of view in order to maintain the transmitted signal 115 on the target 125.

Figure 3:
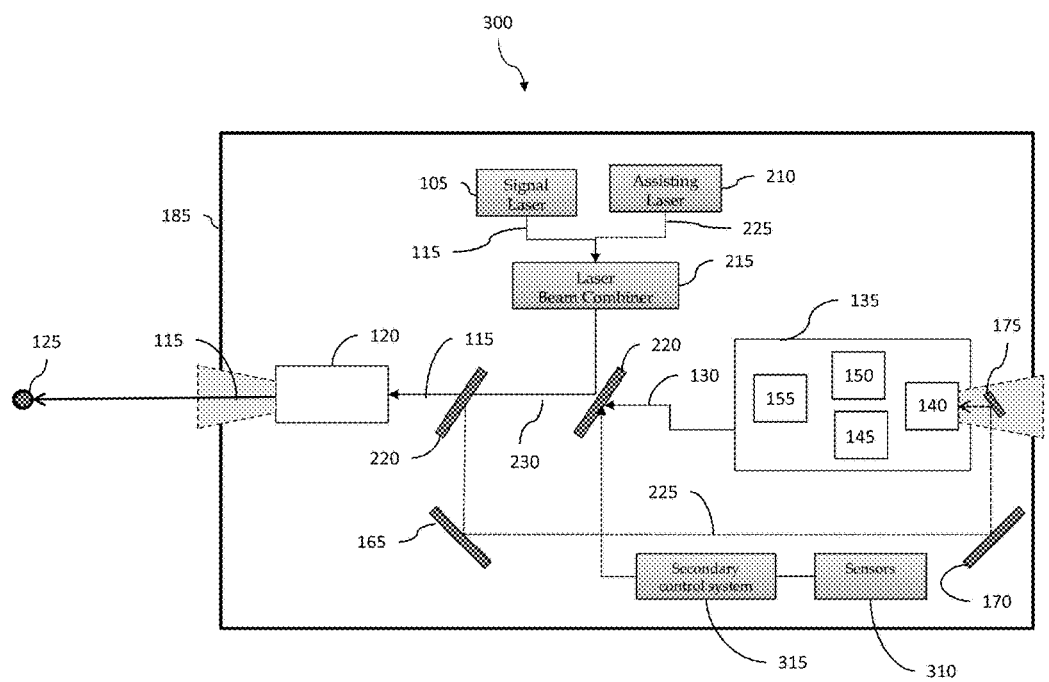
FIG. 3 illustrates yet another example of an optical pointing system according to the disclosed embodiments.

FIG. 3 illustrates yet another example of an optical pointing system 300 according to the disclosed embodiments. The optical pointing system 300 is similar to the optical pointing system 200 but may also include one or more secondary sensors 310 and a secondary control system 315. The secondary sensors 310 may include one or more angular sensors and accelerometers. The secondary sensors are positioned to detect vibration, acceleration, or other variation in movement of the rigid bench 185 that may have characteristics for which the star tracker 135 may not compensate. Signals from the secondary sensors are provided to the secondary control system 315 which operates in conjunction with the beam steering mirror control system 155 to control the beam steering mirror 220 to compensate for movement detected by the secondary sensors 310.

The disclosed embodiments incorporate a laser beam steering mechanism into a star tracker attitude control system to improving the pointing capability of an optical pointing system. The optical pointing system may be further refined by using a tracking laser in addition to a laser communication signal. Additional improvement may include sensor systems for compensating for vibration or other movement of a bench on which the components of the optical pointing system may be mounted.

It is noted that the embodiments described herein can be used individually or in any combination thereof. It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

Various modifications and adaptations may become apparent to those skilled in the relevant arts in view of the foregoing description, when read in conjunction with the accompanying drawings. However, all such and similar modifications of the teachings of the disclosed embodiments will still fall within the scope of the disclosed embodiments.

Various features of the different embodiments described herein are interchangeable, one with the other. The various described features, as well as any known equivalents can be mixed and matched to construct additional embodiments and techniques in accordance with the principles of this disclosure.

Furthermore, some of the features of the exemplary embodiments could be used to advantage without the corresponding use of other features. As such, the foregoing description should be considered as merely illustrative of the principles of the disclosed embodiments and not in limitation thereof.

The invention claimed is:

1. An apparatus for improving a pointing capability of an optical pointing system comprising:
   a star tracker attitude control system for maintaining an alignment between the optical pointing system and a target;
   a beam steering mirror controlled by the star tracker attitude control system to direct an optical signal to impinge on the target;
   a fixed optical assembly configured to direct a portion of the optical signal from the beam steering mirror into a field of view of a star tracker telescope of the star tracker attitude control system; and
   a detector array for detecting the portion of the optical signal superimposed over a location in a current star scene in the star tracker telescope field of view,
   wherein the star tracker attitude control system is configured to operate the beam steering mirror to maintain the optical signal on the target by maintaining the superimposed signal on the location in the current star scene.

2. The apparatus of claim 1, further comprising sensors for measuring optical pointing system orientation, and actuators for applying force to orient the optical pointing system to a particular attitude.

3. The apparatus of claim 1, wherein the optical signal comprises a transmitted communication signal.

4. The apparatus of claim 1, further comprising a beam combiner for combining a tracking signal with a communication signal to form the optical signal.

5. The apparatus of claim 4, further comprising:
   a wavelength dependent beam splitter for splitting the tracking signal from the communication signal after steering by the beam steering mirror; and
   a transmit telescope in optical communication with the wavelength dependent beam splitter for transmitting the communication signal to the target.

6. The apparatus of claim 5, wherein the fixed optical assembly is configured to direct the tracking signal into the field of view of the star tracker telescope, and wherein the detector array is configured to for detect a location in the current star scene on which the tracking signal is superimposed.

7. The apparatus of claim 6, wherein the star tracker attitude control system is configured to operate the beam steering mirror to maintain the communication signal on the target by maintaining the superimposed tracking signal on the location in the star scene.

8. The apparatus of claim 1, further comprising:
   secondary sensors for detecting a variation in movement of the optical pointing system; and
   a secondary control system for operating the beam steering mirror to compensate for the detected variation in movement while maintaining the superimposed signal on the location in the star scene.

9. A method of improving a pointing capability of an optical pointing system comprising:
   maintaining an alignment between the pointing system and a target using a star tracker attitude control system;
   controlling a beam steering mirror to direct an optical signal to impinge on the target;
   using a fixed optical assembly to direct a portion of the optical signal from the beam steering mirror into a field of view of a star tracker telescope of the star tracker attitude control system;
   superimposing the portion of the optical signal over a location in a current star scene in the star tracker telescope field of view; and
   operating the beam steering mirror to maintain the optical signal on the target by maintaining the superimposed signal on the location in the current star scene.

10. The method of claim 9, wherein the star tracker attitude control system comprises sensors for measuring optical pointing system orientation, and actuators for applying force to orient the optical pointing system to a particular attitude.

11. The method of claim 9, wherein the optical signal comprises a transmitted communication signal.

12. The method of claim 9, further comprising combining a tracking signal with a communication signal to form the optical signal.

13. The method of claim 12, further comprising splitting the tracking signal from the communication signal after steering by the beam steering mirror, and transmitting the communication signal to the target.

14. The method of claim 13, further comprising directing the tracking signal into the field of view of the star tracker telescope and superimposing the tracking signal over a location in the current star scene in the star tracker telescope field of view.

15. The method of claim 14, further comprising operating the beam steering mirror to maintain the optical signal on the target by maintaining the superimposed tracking signal on the location in the star scene.

16. The method of claim 9, further comprising:
   detecting a variation in movement of the optical pointing system; and
   operating the beam steering mirror to compensate for the detected variation in movement while maintaining the superimposed signal on the location in the star scene.

* * * * *